United States Patent [19]

Hofstede

[11] Patent Number: 4,591,436
[45] Date of Patent: May 27, 1986

[54] APPARATUS FOR SEPARATION OF SUSPENSIONS FROM A FLUID UNDER PRESSURE

[75] Inventor: Johannes M. Hofstede, Berkel & Rodenrijs, Netherlands

[73] Assignee: Cojafex B.V., Rotterdam, Netherlands

[21] Appl. No.: 450,422

[22] Filed: Dec. 16, 1982

[30] Foreign Application Priority Data

Dec. 23, 1981 [DE] Fed. Rep. of Germany ....... 3151189

[51] Int. Cl.⁴ ...................... B01D 29/08; B01D 29/38
[52] U.S. Cl. .................................. 210/264; 210/275; 210/290; 210/350
[58] Field of Search ............... 210/275, 290, 350, 352, 210/266, 510.1, 264, 276–279

[56] References Cited

U.S. PATENT DOCUMENTS

| | | | |
|---|---|---|---|
| 547,547 | 10/1885 | Herdeman | 210/290 |
| 638,742 | 12/1899 | Murphy | 210/352 |
| 2,022,524 | 11/1935 | Santiago | 210/189 |
| 2,079,365 | 5/1937 | Thomas | 210/179 |
| 3,278,031 | 10/1966 | Rosaen | 210/106 |
| 3,375,933 | 4/1968 | Rodman | 210/502 |
| 3,547,270 | 12/1970 | Kass | 210/264 |
| 3,897,339 | 7/1975 | Arndt | 210/283 |
| 3,943,092 | 3/1976 | Schmidt | 260/37 |
| 4,186,101 | 1/1980 | Reinhardt | 210/497 |
| 4,246,119 | 1/1981 | Alldredge | 210/279 |

FOREIGN PATENT DOCUMENTS

| | | |
|---|---|---|
| 0001183 | 3/1979 | European Pat. Off. . |
| 38010 | 1/1901 | Fed. Rep. of Germany . |
| 544957 | 2/1932 | Fed. Rep. of Germany . |
| 586064 | 10/1933 | Fed. Rep. of Germany . |
| 832596 | 2/1952 | Fed. Rep. of Germany . |
| 1125889 | 3/1962 | Fed. Rep. of Germany . |
| 1436294 | 10/1968 | Fed. Rep. of Germany . |
| 2136877 | 2/1972 | Fed. Rep. of Germany . |
| 2232533 | 9/1974 | Fed. Rep. of Germany . |
| 1486804 | 1/1975 | Fed. Rep. of Germany . |
| 1786563 | 5/1975 | Fed. Rep. of Germany . |
| 2733025 | 1/1978 | Fed. Rep. of Germany . |
| 2757090 | 6/1978 | Fed. Rep. of Germany . |
| 2702210 | 7/1978 | Fed. Rep. of Germany . |
| 2900517 | 7/1980 | Fed. Rep. of Germany . |
| 3006171 | 5/1981 | Fed. Rep. of Germany . |
| 1547029 | 12/1967 | France . |
| 172006 | 12/1977 | Hungary . |
| 51130 | 10/1941 | Netherlands . |
| 868139 | 5/1961 | United Kingdom . |

OTHER PUBLICATIONS

"Waste Water Engineering", Metcalf Eddy Inc., McGraw Hill Company, 2nd Edition, pp. 228–231.

Primary Examiner—Ivars Cintins
Attorney, Agent, or Firm—Spencer & Frank

[57] ABSTRACT

Apparatus for the separation of suspended solids from a fluid under pressure, by means of a granulate-bed, consisting of granulates of at least two sizes of grain of a material which does not swell during the filtration operation. During the filtration operation, the fluid flows through the granular medium filterbed in one direction and filtrate used for backwashing the separated solids flows in the opposite direction. The granulate-bed is held firmly together during the filtration operation and during the purification by a compression source, that generates such a compression on the granulate-bed, that it keeps the relative position of the granulate-particles with respect to each other in the granulate-bed, both under the action of flow during filtration process as well as during the purification process, in essence permanently in place.

35 Claims, 9 Drawing Figures

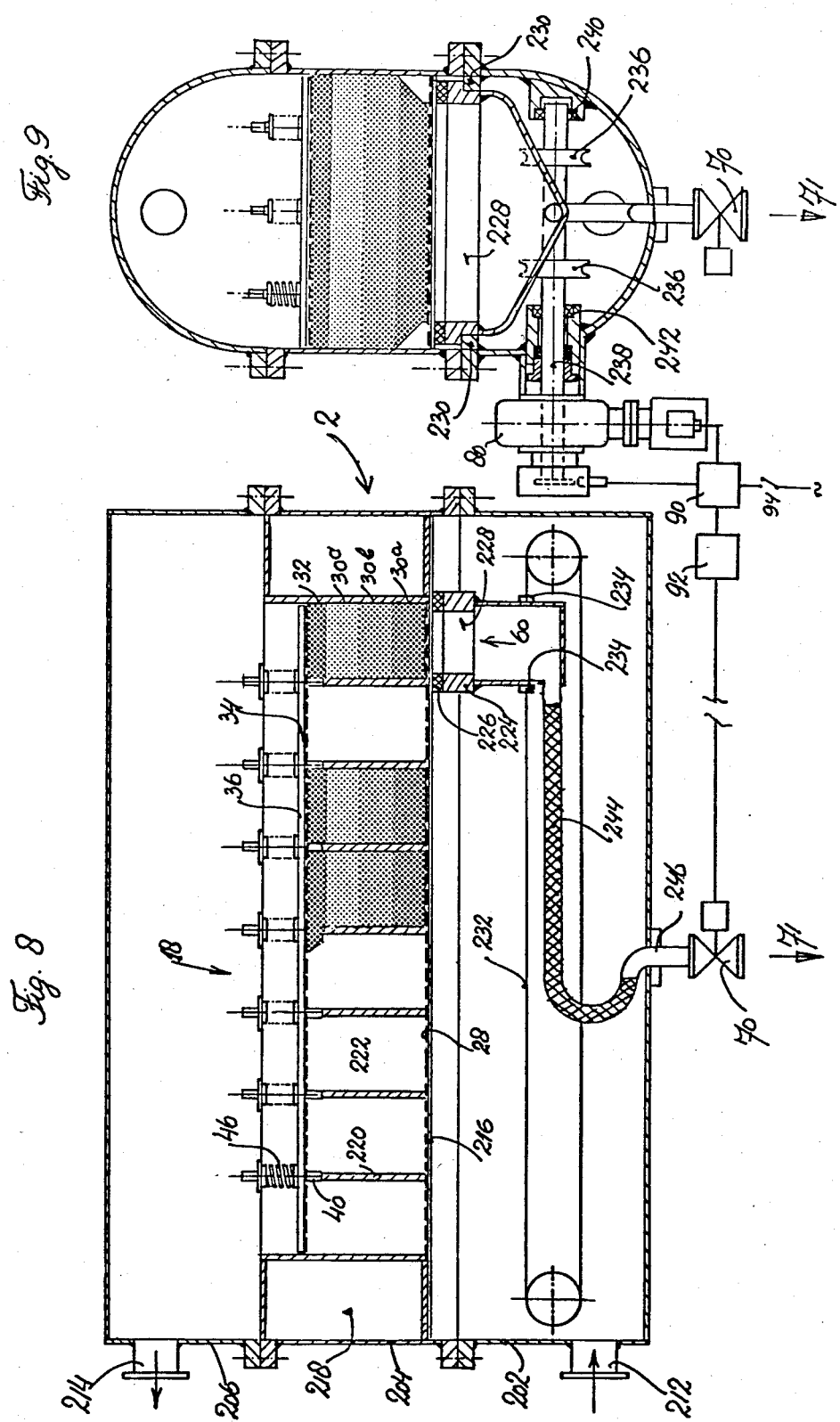

APPARATUS FOR SEPARATION OF SUSPENSIONS FROM A FLUID UNDER PRESSURE

BACKGROUND OF THE INVENTION

The invention relates to an apparatus for the separation of suspended matter from a fluid under pressure.

Suspended matter are particles typically in a size range between one thousand of a millimeter and some millimeters, and can be present in concentrations of a few milligrams up to a few grams per liter of fluid.

It is known to separate such suspensions in a bed in which granular material is used as the filter medium. As a particularly cheap and at the same time sufficiently effective, granular material, broken or ground (rounded) sand, e.g., quartzsand, as well as ground anthracite have proven themselves. These granulates are relatively hard and do not swell during use. The invention takes also other not swellable granulates into consideration, such as e.g., small silicate balls, small hollow balls of aluminum oxide as well as other manmade granulates of comparable kind, inclusive of plastic or epoxy material, which have a lower hardness than, for instance, sand, but do not really swell under the filtration conditions. Preference is given to such granular mediums which behave principally inertly during the filtration process. It is also possible to apply granulates of various grain sizes, as well as mixtures of different kinds of granulates.

Granulate beds have the advantage that by very simple means, that is, by using an adequate size of granulate, almost any required size of pore can be reached in order to undertake in these pores, in principal and apart from some surface and other effects of second order, all the wanted mechanical separation.

It is known (DE-AS No. 11.25.889) to use stratified granulate beds, in which the grain size decreases in the direction of flow of the fluid to be filtered. In many cases, however, also homogeneously mixed granulates of various grain size are used. Granulate beds of this kind do not require a regeneration like some beds of activated carbon. They must, however, be freed from separated matter by means of a backwash flow in the reverse flow direction. With conventional equipment of this kind, the granulate bed normally is flowed through in one direction by the fluid to be filtered for such a period of time until, owing to separation of an increasing quantity of suspension, the pressure drop over the filter bed reaches a critical limit. Then the granulate bed is purified by means of a wash fluid in the reverse direction of flow to remove the separated suspensions via a separate outlet.

The most usual granulate beds are those in which, prior to processing, granulates of various particle sizes are arranged in such a way that the fineness of the particle size proceeds in the downward direction. Such granulate beds are then downwardly perpetrated with the fluid to be filtered until a backwash in the reverse direction will be required. This backwash flow, however, fluidizes the granulate bed and by doing so it causes a mixing of all the particles present in the bed, so that after some time, contrary to the required division of pores, the granulates of finer size lie at the top and the granulates of larger size at the bottom.

It is already been tried to avoid this inversion-effect by using granulates of different specific gravity, but without reaching convincing results in preventing the above described mixing. Besides, granulates that are selected according to their specific gravity are not always the optimum for the required filtration-function.

With granulate beds for the filtration of a liquid fluid, often additional fine-divided air is supplemented during the backwash procedure in order to transfer the granulate bed into a fluid bed, so that in this way separated suspensions can still better be freed. One then definitely runs the risk of carrying granulates of the finer size particles along with the backwash fluid through its outlet. In order to prevent this, it has already been considered to keep the granulate bed together by means of a collecting device for the fine grained granulate, e.g., a screen on top of it. (DE-PS 832 596)

As an alternative it has also been considered to have the granulate bed flowed through by the fluid to be filtered in an upward direction. However, this causes even greater disadvantages. Initially, the filtrate can already remove fine size grained granulate from the granulate bed, when a collecting device, e.g., a screen, is not mounted over the granulate bed. Furthermore, this alternative can lead to clod-formation of the separated suspended solids with the fine grained granulate and such clod-formation can only very difficultly be washed out of the granulate bed. Furthermore it is practically impossible to fluidize the granulate bed in reverse direction, viz. in a downwards direction. Consequently, when flowing a fluid from bottom to top through the granulate bed, the backwash fluid also flows from bottom to top through the granulate bed, which results in difficulties with the purification (see: "Waste Water Engineering, Metcalf Eddy Inc., 2nd Edition, McGraw Hill Company, New York, page 229–231, especially page 230, FIGS. 6–30, especially FIG. 3B").

With vertical flown through conventional granulate beds, a very thick layer was thought to be required, to prolongate the operation time of the separation process and hence to use relatively seldom backwashing for purification. Nevertheless, the filtration had to be interrupted for backwashing, either every day or at least in a period of a few days, since as a matter of fact that the real active separation layer represents only a marginal part of the total thickness of such a flowed through granulate bed and this separation layer, in which fine grained granulate is deposited during inversion, is relatively often plugged-up. A construction is known in which granulates are filled in the intervening space between two concentric vertical cylinders and a fluid to be filtrated conducted radially and consequently horizontally through this cylinder-shaped granulate bed from the outside to the inside (HU-PS No. 172 006). In this process it can, however, come to a seperation in the granulate bed during the filtration process, due to flowing downwards of coarse grained granulates and flowing upwards of fine grained granulates. It is also possible that, due to setting of the granulate, openings will occur in the cylindric layer of granulates resulting in a free flow of fluid without separation. With the known similar apparatus (DE-OS No. 2136887), which is especially destined for the filtration of water, e.g., waste water, various vertically positioned granulate beds are introduced, especially fine sand, with a grain size spectrum of 0.05 to 0.2 mm, which are pressed in the recesses of the lattice-like supports with a precompression of at least 10%, preferably more, referred to the normal total density, and held in place by means of porous layers of gauze, which in turn are held by ribs of a distance support. In this process, the porous layer, however, beats out under the pressure of expansion of the pre-compressed granulates. The granulate composition should be as much as possible of the same grain size, so that a filtration effect in essence takes place at the surface of the filter elements exposed to the filtrate and due to this, the rest of the granulate layer—down stream from the surface—has practically no effects on the separation capacity. The known apparatus can only be manufactured in a relatively complicated way, cannot simply be transferred on sand beds with a coarser size of granulate, and is not only limited in the degree of effects due to the essentially only superficial filtration effect, but besides is only suitable for liquids with small suspension load, since otherwise the required backwash frequency will become too high.

Both aforementioned known apparatuses according to HU-PS No. 172006 and DE-OS No. 21 36 877 already underlie the aim, to provide a granulate bed with a comparatively thin layer of granulates, however, without fully succeeding from the point of proper functioning due to the aforementioned reasons.

SUMMARY OF THE INVENTION

The aim of the present invention is to provide a similar apparatus for the separation of suspended solids from a fluid which does not only apply a thin layer of granulate material as filter medium, but also does not change its filtration characteristics remarkably during operation and which is furthermore easily adaptable to numerous different filtration problems.

This object is solved with a similar apparatus with respect to several aspects by the elements or characteristics laid down in claim 1 and/or the remaining claims, particularly the claims directed to a novel backwash arrangement.

With the apparatus according to the invention of claim 1, a self-adjusting pressure force applied to a stratified granulate bed, takes care that all particles of the granulate stay close to each other, as if they are fixed to each other. Only in the microscopic range can small changes in position, such as "dancing" of fine granulate particles in a relatively coarse pore between larger granulate particles occur. Also when the granulate bed is settled under gravity or under the action of a compression force, it is above all integrally held together. Even wearing phenomenons of the granulate, due to crumbling of the grains, can be equalized in such a way by the self-adjusting source of compression so that, even during long run operation, practically no geometric reorientation of the filter medium or stratification of the granulate bed takes place.

Indeed, it is already known from granulate beds of ion-exchange resins, that these resins expand during their regeneration, and that, in order to bring the granulate bed back into its original position after expansion, a back pressure, similar to an air-cushion acting on a perforated cover, is applied. (DE-AS No. 17 86 563 and DE-OS No. 14 36 294.) However, in this case it is only done to allow the granulate bed to expand during regeneration and to come back in its original position after regeneration. The aim of the invention, however, is to keep the granulates in the bed, integral together during the filter operation. With the known systems, the problem of keeping every granulate in its place, which is of special importance with stratified granulate filter beds, is not solved.

None of these already known apparatuses uses a self-adjusting source of force to permanently maintain the structure of a sand bed or comparable other granulate bed and to achieve in this way, with a relatively small layer-thickness, a very high degree of separation not only at the surface, but in the entire bed with a high operational reliability. Now it will even be possible, even with sand filters of usual degree of granulate fineness, that means also with a number of sand granulates with a relatively coarser size of grain, to build very thin layer filter elements, which also possess a high degree of deep separation in continuous operation. With normal sand filter beds, discharge heights in the order of half a meter to one meter are usual; with filter beds according to the invention one can operate when using usual granulate sizes of grain with a total bed-height substantially under 100 mm. Consequently, the invention makes a remarkable saving of room and consequently also a saving in granulate quantities in comparison with conventional granulate filters, especially sand filters.

It has already been proven with an apparatus according to the invention that coarser granulates, that means larger pores, than usual can be applied since the granulate bed is stratified in such a way that the grains decrease in size in the direction of flow of the fluid. The consequence is that the pores decrease gradually in the fluid flow direction. Surprisingly, it was found that very small suspended particles can be separated by using relatively coarse granulates. This phenomenon can possibly be carried back to the fact that the pores become labyrinth- and funnel-like shaped when suitable stratification of the granulates in the filtration direction is applied and behave in the filter bed as a large number of bottlenecklike traps. In those pores probably turbulence takes place, resulting in a conglomeration of finer suspension flocks with coarser flocks, which were earlier caught. Due to the funnel-like shape of a granulate bed, even a stratification of coarser size of grain, an easy cleanability by the washing fluid in the reverse direction (backwash) is possible without the necessity of fluidization of the granulate bed for clearing purposes.

Due to the relatively small thickness and the sturdy condition during operation of the arrangement of the granulate bed, the flow resistance is minimal. Due to the above, larger flow velocities and consequently also larger separation capacities are possible. Due to the relatively small amount of granular material necessary, very exclusive and/or expensive granulates can be used without remarkable influence on the total price of the apparatus. Since it is additionally no longer necessary to select the granulates according to their specific gravity, so that every kind of granulate which can resist the compression acting on the bed and is resistant against the liquid to be filtrated can be used, there are many more possibilities than before for application of the apparatus. Also it is not critical any more, whether the granulate bed is flowed through vertically upwards, vertically downwards or horizontally, since in every position the microscopic structure of the granulate bed is maintained, in essence, the same during the entire duration of operation of the apparatus. In that case, it is even possible to maintain stratification structures over the entire duration of operation of the apparatus with certain directions of flow, which was not possible up till now with conventional granulate beds. In principal, it is possible to hold the granulate bed together through a compression force operating in cross-direction, e.g., by an elastic circumferential bandage. A minimal use of compression power is attained, however, when, according to one feature of the invention, the compression source acts along the direction of the liquid flow. The apparatus according to the invention is furthermore applicable with every kind of required selection of the granulate particles and different grain size provided that the different sizes of grain are equally divided over the granulate bed and also provided that the sizes of grain of the granulate in a stratified granulate bed decrease in single or plural sequence in the direction of flow of the fluid to be filtered, during filtration operation. Even when a granulate bed composed of only two sizes of grain, or few sizes of grain, is considered, it is preferred, that the granulate has a broad spectrum of sizes of grain. From considerations of constructional simplification, in general, the compression force will permanently be kept on the granulate bed. It may, however, be sufficient that the compression force is only applied on top of the granulate bed when the liquid flow runs vertically upwards. The power of compression of the bed can be adjustable, which is commonly known from DE-PS No. 586 064 (page 1, line 1 to 41).

As a self-readjustable source of compression, a hydraulic source with a back pressure valve can be used. This relatively complicated system has the advantage, that readjustment takes place in compression direction only, and not in the opposite direction. The same can be achieved, when the source of energy is a spring device and the spring, in its final position, is no more compressible, e.g., a number of flattened disc springs or a helical spring that is compressed solid. However, a certain back-spring possibility is not harmful as long as the compression power exercised by a spring device is stronger than the forces being produced during operation of the apparatus, especially the forces generated by the differential pressure over the granulate bed. Preferably a spring device is utilized.

The apparatus according to the invention is also suitable for the purification of air. Preferably it is, however, destined for the purification of liquids, e.g., effluent of waste water treatment plants, especially for the reuse of such effluents. The purification of other liquids, e.g., chemical liquids or water from swimming pools, also comes into consideration. The apparatus according to the invention combines small dimensions with large capacity and low price with excellent performance during continuous operation. The apparatus according to the invention has also become competitive, due to these qualities, in a functional way with filtration devices of another construction, e.g. microfilters, which have been preferred in several cases to the functionally often superior granulate bed filters.

Especially for purification of waste waters, sand bed filters, e.g. from rounded quartz sand, are especially suitable. It has namely come forward, that suspended solids still present in the biologically prepurified waste waters have a bimodal character, that means approximately 50% of the suspended solids have dimensions of approximately 3 to 5 microns and the remainder of the suspended solids have predominantly dimensions between 70 and 80 microns (1 micron=0.001 mm), see Waste Water Engineering, page 233-235, especially page 234, FIGS. 6-33. Microfilters and similar filters with essentially uniform pore sizes are less suitable for this purpose.

The apparatus according to the invention is preferably designed in a way by which the granulate is kept between two perforated covers or plates, which are pervious for the liquid but non-pervious for the granulate, and a power source seeks to reduce the distance of the covers with respect to each other. This is commonly known (DE-PS No. 586 064, page 1, sentence 1 to 41). One of the covers can, in a very easy way, be arranged stationary and the other cover movable. Then the stationary cover is developed suitably to a support for interchangeable granulate beds, so that the same housing can quickly be adapted for different filtration purposes, only by changing the internal part (granulate bed). In a constructive way, it is of advantage when spring devices serving as compression source are connected with the base plate (support) of the bed. A further disadvantage of filtering devices with granulate beds was, up till now, that they had to be cleaned in the reverse direction of flow by means of a washing fluid in interrupted distances of time, and that the filtering process had to be stopped during this time. In order to have these operation interruptions take place as infrequent as possible, the granulate beds were not only dimensioned to be voluminous, but additionally a very high load with suspended solids was admitted before a backwash took place. During the increase of the deposition of suspensa in the granulate bed, the flow resistance (pressure drop) increases exponentially, and consequently, the filtration capacity decreases rapidly.

It is known to clean the earlier mentioned cylinder shaped granulate bed (as per HU-PS No. 172 006) in order to prevent the aforementioned disadvantages, in such a way that the cylinder is turning around its vertical axis continuously and passing an outer vertical stationary extraction slit which should serve to suck-back filtrate radially to the outside from the core radius of the cylinder and at the same time separate collected suspended solid particles in reverse flow to the normal filtration direction. In this way, however, it cannot be prevented that liquid to be filtrated also will be sucked from the outer granulate layer of the cylinder in a short circuit way passing along its jacket, and that consequently it does not come to a sufficient deep active purification of the cylinder granulate layer.

Furthermore, it is known (NL-PS No. 51 130) to stretch a conventional filter cloth, e.g. metal gauze, leather tissue or paper tissue, between two perforated support plates and to wash continuously via a circulating hollow arm through which filtrate is being pressed as backwash liquid without interrupting the filtration process. Also, the sequential filtration by means of backwashing with separate filter elements using a circulating backwash arm arranged to a circuit is known (DE-OS No. 27 57 090).

It is, however, a further object of the invention to provide a novel and improved apparatus for separation (filtration) of suspended matter, which includes a granular medium filter bed, which can be cleaned (backwashed) effectively with a relatively low consumption of wash liquid, and without considerable disturbance of the filtration process.

This aim is solved by additional features of the invention as characterized in certain of the claims whereby the filter bed is provided with at least two in-line filter passages and a backwash arrangement is provided whereby one or more of the passages may be backwashed with filtered fluid while the remaining passages are simultaneously being used as a filter. This continuous backwash feature and only functions as an addition to the basic concept of the invention to provide a possibility for continuous operation with a low need for backwash liquid, but moreover has an independent inventionary significance. Besides, the filter bed apparatus can consist of a granular medium bed built-up from loose granulate particles or alternatively of a granulate bed in the form of a matrix, e.g., by using granulate particles sintered, welded, or cemented together, as known from DE-AS Nos. 30 06 171, 22 32 533 and 14 86 804 or DE-OS No. 27 02 210. Due to the fact that the granulate bed is divided into at least two passages, situated in the direction of the flow of the fluid, and separated from each other, and that these passages are sequentially used for filtration and for backwashing, unwanted interactions between filtration and backwash are eliminated and an adequate cleaning of a section of the granulate bed or matrix can be executed with a minimum and controllable amount of backwash fluid.

It is known, as such, to divide a granulate bed into individual parts, separated from each other (U.S. Pat. No. 2,021,919). However, with this known device this deviation simply serves to divide the water flow arising in a water softener into a multiple of parallel flow streams in order to prevent channel forming and hence ruptures in the granulate bed. A further development of such a device, with which channel-forming partitions are only anticipated in the upper section of the granulate bed, is shown in DE-AS No. 12 84 397 (U.S. Pat. No. 824,318).

Preferably, according to the invention, the filter bed is divided in a large number of passages, so that the active (filtration) part of the filter bed is large in comparison with the backwash part. Accordingly, a predominant part of the filter bed is permanently at disposal for the filtration process. Since only a small part of the filter bed surface is sequentially cleaned, it is possible to execute the cleaning (backwashing) of this part in a relatively short period of time and with a small amount of fluid. By choosing the right frequency of sequential backwashing of the sections of the filter bed, a balance can be reached between collecting and removing of suspended matter in the granulate medium filter bed, resulting in a low relative presence of suspended matter in the filter bed. It is sufficient that only one section of the filter bed at a time is backwashed. When, for example, the total working area of the filter bed is divided into twenty sections, every now and then only one passage conduit has to be disposed for cleaning, and consequently only 5% of the total surface area is being cleaned at any time.

A frequent sequential cleaning (backwashing) of the sections of the filter bed opens the possibility to reduce the thickness of the granulate bed much further compared with discontinuous backwash operation. Moreover, the frequently cleaned granulate bed has a practically constant flow rate over an unlimited period of time.

The number of twenty divided sections of the filter bed, should be considered as an example only. That is, more or less sections could be applied.

As with the known continuously cleaning filter device, it is possible, in principle, to move (turn) the connection of the wash liquid continuously over the section of the granulate bed. However, it is more appropriate, when the connection of the wash liquid is being moved (turned) step wise that the backwash not be effective when moving from one section to the other. That means backwashing should only be possible when the backwash connection is in the right position and no longer moving (turning).

The backwash is most effective when the connection for the wash fluid is exactly positioned and sealed to the section to be washed, so that no short circuit can occur in a transverse direction, that is between a section of the filter bed in operation as a filter and the section to be washed. Preferably the connection for transport of the wash fluid to the sewage is only open when the backwash connection is in the proper position with regard to the section—or sections—to be washed.

The washing effect can be increased when the velocity of the washing fluid is higher than the velocity of the fluid during filter process. Liquid filters are typically operated with a back pressure of at least one atmosphere, equal to a 10 meter water column. Granular medium fluid filters are typically operated with a pressure drop over the filter bed of a 2 to 3 m water column and a back pressure of approximately a 10 m w.c. (1 atm. gauge). Since the backwash drain is mostly connected to the sewer, that means atmospheric pressure, nearly the full back pressure of 10 m w.c. is available for backwash. That means that since the pressure drop varies with the second power of the velocity, the velocity of flow during the backwash is at least 1.5 times higher than during the normal filtration process in the granulate bed and hence more effective. It is preferred to have always a higher pressure drop available during backwash than during the normal filter process. If the back pressure is so low so that there is not ample pressure left for backwash, it is recommended to apply a vacuum to the backwash connection.

Preferably a device is anticipated for an intermittent flow of backwash fluid through the section to be washed. Such an intermittent backwash procedure has the advantage that deposited suspended solid particles can easily be loosened by a pressure push from the granulate bed, without the need to fluidize the granulate bed. Preferably each section of the granulate bed is washed by applying a number of pulses before washing the next section.

An especially compact construction of the apparatus according to the invention is achieved when the granulate bed is shaped cylindrically with the sections being formed by separated sectors divided over the total area of the granulate bed, and a connection for the wash liquid (backwash arm) is turning around the central axis of the granulate bed with the aperture of the backwash arm being complementary to the sector-like opening of the appropriate section.

In this case two especially preferred arrangements are given. According to one arrangement, the axis of the granulate bed is situated vertically and the granulate bed is also flows through vertically. According to the other arrangement, the axis of the granulate bed is directed horizontally and the granulate bed is consequently flowed through horizontally.

Alternatively the sections can be arranged next to each other. Then it is preferable that the connection of the wash liquid is movable step by step in the axial direction.

In order to make sure that the sections arranged more to the inner part of the granulate bed are more repeatedly cleaned in comparison with the sections arranged to the outside, it is appropriately arranged that the specific wash time of each section is chosen equally. This can be executed pre-adjustable by a timing program for moving the connection of the wash liquid in communication with a certain section and/or adapting the duration of the washing of the section in question.

A further function of the separation wall between the sections or, at least of one separation wall, preferably of all separation walls, can be to act as a support for a spring device, serving as a pressure source, and in this way an excellent connection is formed between the movable perforated cover and the bottom of the granulate bed.

On the other hand, a separation wall between the sections should not obstruct the compression of the granulator filter medium. In order to prevent an undesirable interaction, it could be arranged, for example, in such a way that the separation walls extend only over a part of the flow through length of the granulate bed and that the next part of the bed, seen in the flow direction of the liquid to be filtrated, is filled up with coarse but rounded and easy flowing granulates divided over the entire surface so as to maintain the distance between the partition walls and the sections, and to take care of transmitting the compression forces to the granulate bed or matrix serving as the filter medium. This is in force also when only one single partition wall is foreseen. Alternatively, a cover on the granulate bed could be provided with recesses into which the partition walls can penetrate. The coarse grained and rounded granular distance layer represents, however, a more simple and novel solution. A transverse flow of the liquid for backwash purposes, occurs only after complete filtration in the downstream part of the filter bed and not, as with the known equipment mentioned before, already in the upstream zone.

The invention will be explained more fully in the following several execution examples based on schematic drawings.

BRIEF DESCRIPTION OF THE DRAWINGS

FIG. 8 is a vertical longitudinal cross-section through a third filtering apparatus according to the invention.

FIG. 9 is a vertical cross-section through the third filtering apparatus of FIG. 8.

DETAILED DESCRIPTION OF THE PREFERRED EMBODIMENTS

Figure 1:
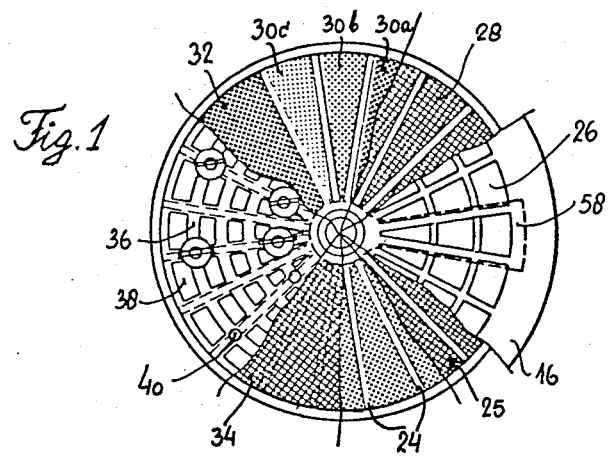
FIG. 1 is a top view, partly cross-sectional, cut into several axial heights, over the internals of a first filtration apparatus according to the invention.

The first filtering device as per FIGS. 1 to 4 represents in essence a cylindrical-shaped housing 2 with vertical axis which housing, in essence, is composed of an upper part 4 and a bottom part 6. The bottom 6 and top 4 of the housing 1, have been executed as domes and upper and bottom parts are connected to each other in the range of the cylindric part of the housing 1.

The bottom part 6 is provided with an inlet 8 for the fluid to be filtrated, preferably a liquid, and the upper part 4 is provided with an outlet 10 for the filtrate.

The upper and bottom parts 4 and 6 are provided with connecting flanges 12, which are bolted together by means of a suitable number of bolts 14 divided over the circumference of the flanges 12 and between which a supporting plate 16 for an insert 18 is fixed in the housing. The insert 18 represents the actual filter-active part of the apparatus.

On the top of the supporting plate 16 a cylindrical outer jacket 20 and, in the center, a boss 22 of certain length are fixed. The annular space between the outer jacket 20 and boss 22 is divided in a number of liquid tight, in this case twenty, sectors of the same size through radially extending partition walls 24 which have a lower height than the outer jacket 20. The supporting plate 16 is provided with openings 26 in each single sector, and in each sector the openings 26 are covered with a suitable gauze 28. In each sector a layered granulate bed 30 is arranged above the gauze 28 and extending over the height of the partition walls 24. The bed 30 shown is a three layer composition, starting with a first layer 30a of relatively coarse granulate situated next to the gauze 28, a next layer 30b with middle size granulates followed by a fine size granulate layer 30c. This three layer construction should only be considered simply as an example but every other layer composition can be applied, for example a multiple of layers, with which the size of granulates is gradually decreasing from bottom to top.

On top of the layer 30c with the finest size of grain, and simultaneously above the partition walls 24, a coarse grained granulate layer 32 from easy flowing, rounded granulate is applied between boss 22 and outer jacket 20, that is, over the entire annular space. The upper edges of the partition walls next to this granulate layer 32, are executed streamlinelike rounded.

On the granulate layer 32 a gauze 34 is laid, which again extends over the entire circumference of the granulate bed 30 between the boss 22 and the outer jacket 20. On the gauze 34, a perforated cover 36 is laid. Its perforations 38 can be equally divided. From the upper edge of every second partition wall 24, two stud bolts 40 extend upwards and through a hole 42 in cover 36 to the outside. One row of stud bolts 40 is arranged in the neighborhood of the outer jacket 20, while the other row is in the neighborhood of boss 22. The free end of each stud bolt 40 is provided with screw thread on which a set nut 44 is adjustable. Between the set nut 44 and the cover 36, a helical wounded compression spring 46 is mounted, whose precompression can freely be chosen by adjusting the set nut 44. A chosen position can for example be secured by means of a safety pin 48. The preset compression springs 46 are acting together and by means of cover 36, as a compression source working on the granulate bed 30 via the coarse grain sized granulate layer 32, to keep the relative position of the granulate particles in the granulate bed in principle permanently equal and close to each other under all terms of operation as explained more fully below.

When a settling of the granulate bed 30 and/or the granulate layer 32 should occur, e.g. due to wearing, a decomposition of the granulate bed could take place. However, the compression force is chosen in such a way that an automatic adjustment takes place, and the aforementioned relative position of the granulate particles remains unchanged in essence. If necessary, the set nut 44 can be readjusted after a certain period of time.

The gauze layer 28, as well as the gauze layer 34 in combined action with the granulate layer 32 have been chosen and dimensioned in such a way that granulate particles of any size of grain are held in place between both aforementioned enclosements of the granulate bed, but that passage of the liquid to be filtrated and of the wash liquid, is possible.

The boss 22 is provided at both its axial ends with bearing bushes 50 for a shaft 52. The shaft 52 extends from the bottom side of the support plate 16 through the boss 22 upwards, and is connected by means of coupling 54 to a driving shaft 56 which is led through the upper part 4 of the housing 2 in a fluid tight manner.

To the lower part of shaft 52 a radially extending backwash arm 58 is fixedly connected. This arm 54 shows an opening 60 serving as the connection 64 for wash liquid. The opening is shaped complementary to the opening 26 of a sector of the granulate bed 30. Between the surface of the backwash arm 58 directed toward the support plate 16 and the lower part of the support plate 16, an elastic sealing plate or gasket 62 is intermediately placed, that is, fitted to the backwash arm 58, and is carried along by this arm 58 during rotation of shaft 52. The sealing plate 62 has an opening in the same shape as opening 60 and serves to such an end, to communicate freely with the backwash arm, when it is placed under a certain sector. At the same time, however, the plate 62 has the task of preventing leakage between the backwash arm 58 and the support plate 16. The sealing plate 62 can, for example, be made from a synthetic rubber. During rotation of the shaft 52, the backwash arm 58 can consequently be brought into communication with each of the twenty sectors of the granulate bed, which each form for itself a filter section 25. In line with the shaft 52, the backwash arm 58 is extended in downward direction in a tube 64, which is connected by means of a sealing ring 66 through the bottom part 6 to the outside and to a tube 68, which is connected via an automatic valve, for example a magnetic- or pneumatic-valve 70, to an outlet for wash liquid. This outlet can be either a sewage, a collecting tank under atmospheric pressure, or even a collecting device working under vacuum, for example the combination of a vacuum pump with a corresponding collecting vessel. The part of the shaft 52 projecting upwardly from the boss 22 is provided with a screw thread on which two contrary countering set nuts 72 can be adjusted. A washer 74 is arranged under the set nuts 72 and serves for supporting a helical wounded spring 76, which is placed over the extension of the shaft 52 and is supported on top of another washer 78 acting against the surface of the boss 22. The compressed spring 76 serves to press the backwash arm 58 always under prepression together with the sealing plate 62 against the bottom of the support plate 16 and to guarantee in this way a continuous sealing effect, even in the case of wear of the elastic sealing plate 62.

Figure 2:
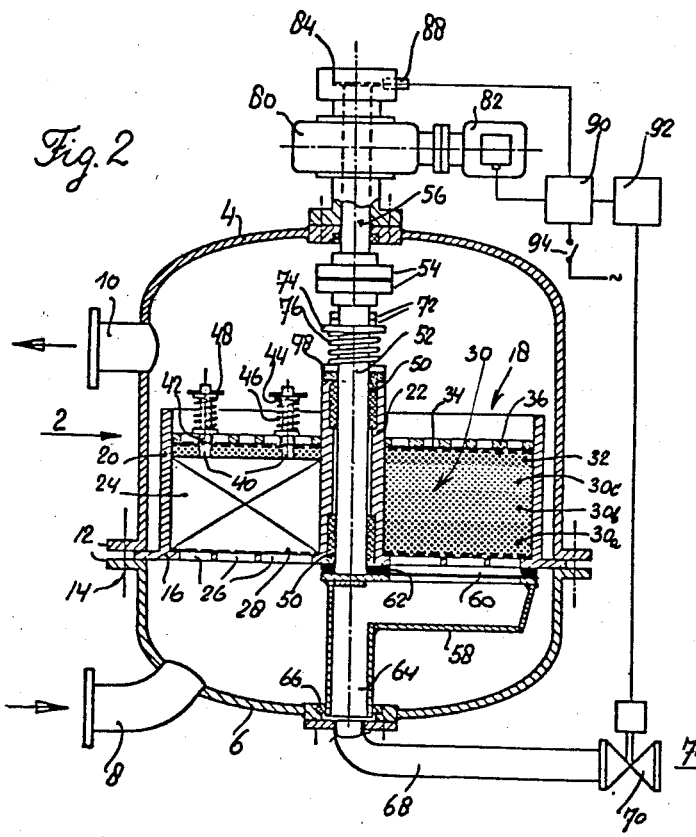
FIG. 2 is a vertical, longitudinal section over the apparatus as per FIG. 1.
Figure 3:
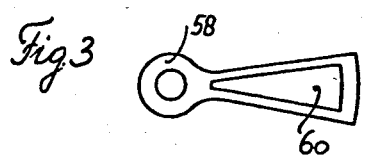
FIG. 3 is a top view of a backwash arm, used with the apparatus as per FIGS. 1 and 2.

The driving shaft 56 is connected with a driving unit outside the housing 2 which, as shown in FIG. 2, includes a gear box 80 and a stepwise controlled electric motor 82.

In an extension of the driving box 80, the driving shaft 56 bears a switch wheel 84 with twenty teeth 86, which are divided equally over the circumference of the wheel 84 and whose number of teeth in general corresponds with the number of sectors of the granulate bed.

Figure 4:
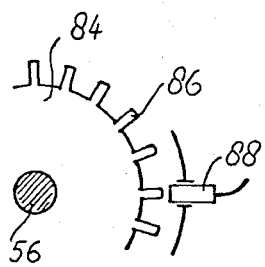
FIG. 4 is a partial view of a mechanic electrical control of the apparatus as per FIGS. 1 to 3.

The teeth 86 cooperate with a contactless, e.g. inductive, switch 88 (see FIG. 4). The stepwise driven motor 82 is controlled via an electronic timing relay 90, which is connected to the switch 88. The timing relay 90 further serves to switch a second electronic timing relay 92, which switches the control valve 70.

Figure 5:
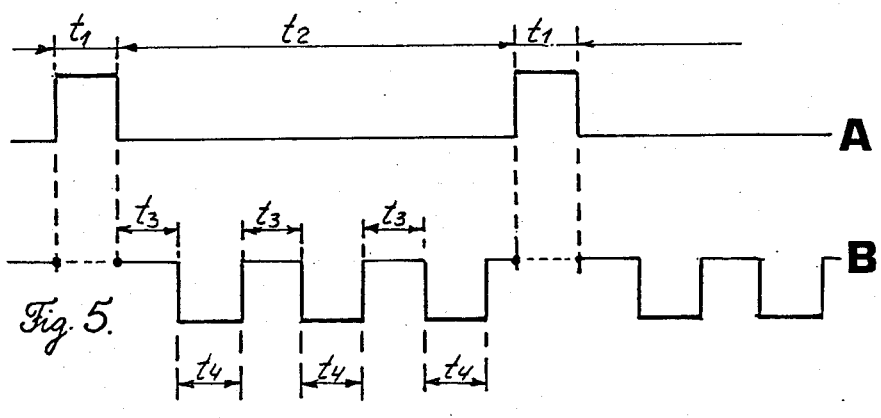
FIGS. 5 and 6 show two different backwash diagrams.
Figure 6:
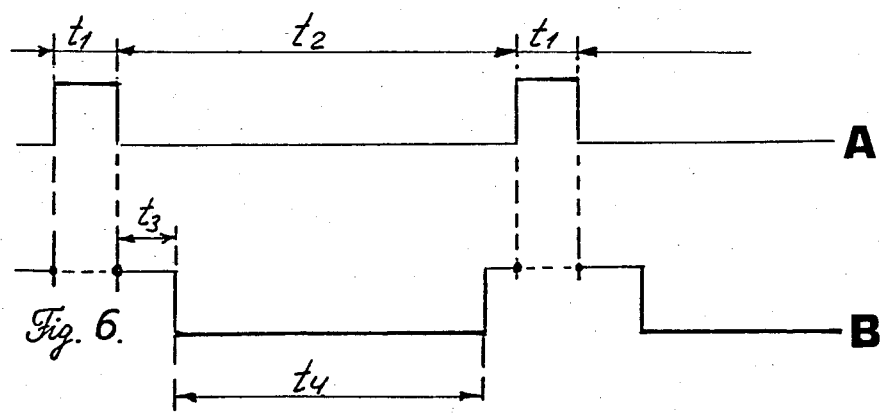

Two possible kinds of control are shown in FIGS. 5 and 6. At first the more simple control of FIG. 6 is taken into consideration. When switching on the main switch 94, which is connected between the timing relay 90 and an electrical source, in this case an AC-source, the motor 82 is now connected to the electrical mains during the time t1 and turns the shaft 52 together with the backwash arm 58. The time t1 has ended when a tooth 86 of switch wheel 84 approaches the device 88 and switches off the motor 82 via the timing relay 90. At that point of time, the backwash arm 58 communicates with a certain sector of the granulate bed and will stay here for a period t2.

During the period of time t2, a second timing relay 92 comes into action. This relay 92 has a double function, i.e. first to set the time t3 and second to control the opening time t4 of the control valve 70. The sum of the times t3 and t4 is such that it is smaller, or at least equal to, time t2. After expiration of time t2, the motor 82 is switched on again by relay 90; the second timing relay 92 is switching off, and the backwash arm moves to the next sector of the granulate bed and the aforedescribed washing cycle starts again. In FIG. 5, and also in FIG. 6, the line A indicated the switch times of the timing relay 90 and the line B the switch times of the timing relay 92. Switching on of the control valve 70 preferably takes place in such a way that the valve 70 opens fully at once, resulting in a shockwise flow of backwash fluid. With the move of operation as shown in FIG. 5, a multi-shockwise backwash period is executed. FIG. 6 also shows that one wash period t4 per time t2 can be executed.

A typical example of setting according to FIG. 5 is:
t1=3 seconds
t2=120 seconds
t3=20 seconds
t4=15 seconds.

FIG. 6 shows an example of settings in which t1, t2 and t3 are the same as in FIG. 5 but t4 is set on 85 seconds. With the timing relays 90 and 92, it is possible to set t2, t3 and t4 on every wanted value between 1 and 500 seconds.

Figure 7:
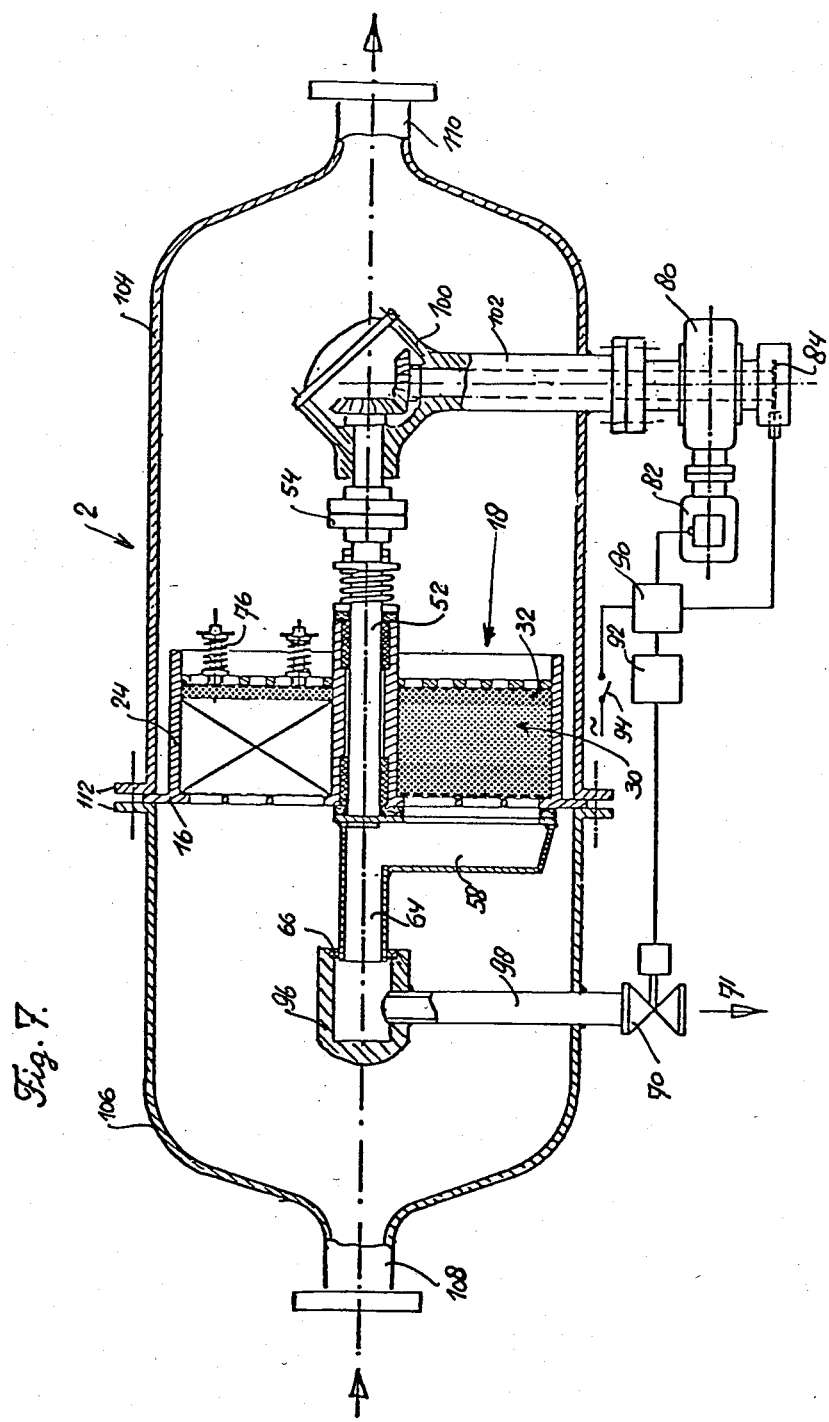
FIG. 7 is an axial vertical cross-section through a second filtering apparatus according to the invention.

With the second apparatus as per FIG. 7, the construction of the insert 18, which is supported by the support plate 16, is similar to the apparatus formerly described, so that, in order to prevent repititions, it can be reverted to this description. The only difference simply is that the axis of the insert 18 is not directed vertically, but horizontally. The housing 2 is again constructed in two parts 106 and 104, with flanges 112, between which the support plate 16 is clamped. To this point, the construction is similar to that of the first apparatus. The inlet connection 108 and the outlet connection 110, however, are here directed axially running horizontally, instead of radial as in the previous apparatus. Based on the compression force, exercised by the compressed springs 46, on the granulate bed, as itemwise described with the first apparatus, it does not come to undesirable changes in the structure of the granulate bed, with the arrangement of the layers as per FIG. 7, in which the layers are extending vertically and the size of grain is diminishing in the horizontal direction. The mode of operation of the backwash arm 58 and the driving of the shaft 52 corresponds, in essence, to the description of the first apparatus, any differences being neglectable. The tube 64 is in this case not connected with part of the housing 2 via the sealing ring 66, but rather with a tube corner piece 96, that communicates with a tube 98 which is tightly passing through part 106 of the housing 2 and connected to the control valve 70. On the other hand, the coupling 54 connected with shaft 52 is connected to an angular drive 100 which is still situated within the housing 2 and conducts its driving shaft 102 through the housing to the gear box 80. The drive of the driving shaft 102 for driving the shaft 52, and together with same the backwash arm 58 on the one hand and on the other hand the control of the control valve 70, takes place in the same way as described for the first apparatus. With the first apparatus, as well as with the second apparatus, the insert 18 together with the support bottom 16 and the backwash arm 58 can be interchanged in an easy way. For example, different filtering beds with suitable accumulation capacity can be chosen, based on the quantity of suspended solids in a fluid to be filtrated, or based on the kind of the fluid to be filtrated, e.g. a liquid. For example, the thickness of the filter-active granulate bed can be chosen between for instance 50 and 300 mm, as well as to adapt the sizes of grains in the single layers and the relative thickness of such layers, as well as the kind of the granulate suitable for the fluid to be filtered.

With the third filtration apparatus as per FIGS. 8 and 9, the housing 2 is not essentially cylindrical, but essentially rectangular, in contrast to the first and second embodiment. Similarly to the first and second apparatuses, the housing 2 can be more than bipartite, and in the third embodiment is tripartite, namely the housing parts 202, 204 and 206, which extend vertically over each other and are connected to each other via connecting flanges 208 and 210. At a front or end surface of the housing 2, the lower housing part 202 has an inlet connection 212 for the liquid to be filtrated and the upper housing part 106 has an outlet connection 214 for the filtrate. The middle housing part 204 forms here an interchangeable unit 18 together with the support bottom 216 integrally arranged in it. On top of support bottom 216, space for the granular filter bed is situated and divided in a number of rectangular sections by means of partition walls 220.

Between both hollow profiles 218, which have no special function, a number of partition walls 220 are situated, forming, in this case 8, equally divided rectangular chambers (sections) for the passage of the fluid to be filtered. Apart from the fact that here the sections 222 are rectangular and not, as with the first and second filtration apparatus, sectorwise, the composition of the granulate bed is similar to those of the first and second apparatus. In this connection, the support plate 216 between the hollow profiles 218 is perforated and on top of it lies a suitable gauze 28. Above this gauze the formerly described three layers, granulate bed 30 is situated and covered with the distance holding, coarse grain sized and easy flowing granulate layer 32, continuously extending over the partition walls 220. A gauze 34 and a coverplate 36, rectangular in shape, extend over the granulate bed 30. This cover 36 is pressed against the granulate bed by means of helical springs 46 in a manner as formerly described. Also in this case, the compression springs 46 are mounted on an adequate number of stud bolts 40, which are firmly connected to the partition walls 220. It will be clear that the execution according to FIG. 8 is not limited to 8 sections but that any desired number can be chosen. Instead of a rotating backwash arm 58, in this case a rectangular shaped backwash device 224 is chosen. The device 224 is provided with a sealing plate 226 being of the same material and having the same function as plate 62 formerly described. By means not described in detail, the backwash device 224 is permanently and under prepression held against the bottom part of the support plate 216. The rectangular opening of the backwash device 224, being the connection 60 for the wash liquid, is dimensioned in such a way that it corresponds with the shape of perforations in the support plate 216. The sealing plate 226 serves to seal the opening 228 of the backwash device 224, serving as connection 60, against leakage at the bottom side of the support bottom 216.

The backwash device 224 can move i.e., reciprocate, on guides 230 and can be step by step connected to the particular section 222 to be washed. As a way of moving the backwash device 226 along the guides 230, for example a chain can be used which is connected to the backwash device 224 at two positions 234. The driving chain 232 is executed as a pair of chains which run parallelly over two driving rollers 236 which are situated on a driving shaft 238 whose free end is supported on the wall of the lower housing part 202 in a bearing 240, and whose other end is passed through the side wall of the lower housing part 202 and supported in a sealed bearing 242. The outer end of the driving shaft 238 is, analogous to the formerly described ways of execution, connected via the gearbox 80 to a motor drive for moving the backwash device 224. The backwash device 224 is furthermore connected, by means of a flexible hose 244 with a suitable length and through an outlet 246 in the lower housing part 202, with the control valve 70, which leads for example to the sewage for the wash liquid. The control of the timing of the backwash of each section of the granulate bed with wash fluid and the displacement of the backwash device 224, takes place analogous to the way described above for the first and second embodiments. With all three described embodiments the filtrate already filtered in the granulate bed, serves as wash fluid. This filtrate will be flowed, in a predetermined time schedule, through the connection 60 for wash fluid for cleaning of the granulate bed, and suspended solids separated in this process will be carried off by the control valve 70 along the relative arrow 71. Whereas with common filtration with granulate beds the amount of filtrate used for backwashing represents 2 to 5% of the filter rate, only 0.3 to 3% is required with the apparatus according to the invention.

We claim:

1. Filter apparatus for the separation of suspended solids from a fluid under pressure, comprising: a housing having a fluid inlet and a fluid outlet; a filterbed, composed of a granular medium which is of at least two grain sizes and which does not swell during filtering, said filterbed being disposed in said housing between said inlet and said outlet so that, during the filtration process the fluid can flow in one direction through said filter bed and so that collected suspended solids can be removed from the filterbed during a backwash operation with a flow of wash-fluid in the reversed direction through the filterbed, said granulate filterbed being composed such that the granulates are straticulate in one or more sequences according to grain size with said grain size diminishing in the direction of flow of of the fluid to be filtered during the filtration process; and self-adjusting pressure source means for providing a continuous compression force on said granulate bed, so that said filterbed, during the filtration as well as during the backwash process, is held together with the relationship of the granulates to one another remaining substantially permanently the same under the influence of filtration and backwash flows.

2. Apparatus for the separation of suspended solids from a fluid under pressure, according to claim 1 wherein said pressure source means acts parallel to the fluid flow direction.

3. Apparatus for the separation of suspended solids from a fluid under pressure, according to claims 1 or 2, in which the granular filter medium has more than two different grain sizes.

4. Apparatus for the separation of suspended solids from a fluid under pressure, according to claim 2 in which the granular filter-medium is kept between covers which are pervious to the fluid to be filtered but im-pervious to the granular filter-medium, and said pressure source means tends to shorten the distance between said covers.

5. Apparatus for the separation of suspended solids from a fluid under pressure, according to claim 4, in which one said cover is stationary, and the other said cover is movable.

6. Apparatus for the separation of suspended solids from a fluid under pressure, according to claim 5, in which said stationary cover of the granulate-bed is a support plate for said filterbed and is removably mounted in said housing.

7. Apparatus for the separation of suspended solids from a fluid under pressure, according to claim 6 in which said pressure source includes at least one spring which is connected with said support plate.

8. Apparatus for the separation of suspended solids from a fluid under pressure, according to claim 1, in which said pressure source means is adjustable.

9. Apparatus for the separation of suspended solids from a fluid under pressure, according to claim 1 in which said pressure source means includes a hydraulic cylinder with a back-pressure valve in the hydraulic supply-pressure line.

10. Apparatus for the separation of suspended solids from a fluid under pressure, according to claim 1 in which said pressure source means is a resilient device.

11. Apparatus for the separation of suspended solids from a fluid under pressure, according to claim 10, in which said resilient device includes a mechanical spring.

12. Apparatus for the separation of suspended solids from a fluid under pressure according to claim 1 in which said granulate filterbed is divided into at least two passages which are in line with the direction of the fluid flow and separated from each other, and through which the fluid to be filtered continuously flows during the filtering process; and wherein backwash means are provided for sequentially subjecting said passages to a backwash procedure by causing filtered fluid to flow in the opposite flow direction through the passage being washed while the remainder of said passages are simultaneously functioning as filters.

13. Apparatus for the separation of suspended solids from a fluid under pressure according to claim 12, in which the number of passages in use as a filter is substantially greater than the number of passages simultaneously being washed by said backwash-procedure.

14. Apparatus for the separation of suspended solids from a fluid under pressure, according to claim 13, in which said backwash means sequentially subjects only one passage at a time to said backwash-procedure.

15. Apparatus for the separation of suspended solids from a fluid under pressure, according to claim 12 in which said backwash means includes a member which is disposed between said bed and said inlet and is movable relative to said bed, an inlet opening for the washfluid disposed in said member and facing said bed, an outlet for the wash fluid extending from said member to a position outside of said housing, and means for displacing said member step by step.

16. Apparatus for the separation of suspended solids from a fluid under pressure, according to claim 15 further comprising means for causing said inlet opening of the backwash means to be fluid-tight connectable to the entrance opening of the corresponding said passage.

17. Apparatus for the separation of suspended solids from a fluid under pressure, according to claim 15 further comprising means for opening said outlet for the wash fluid only when the inlet opening of said member is exactly opposite said entrance opening of a passage to be backwashed.

18. Apparatus for the separation of suspended solids from a fluid under pressure, according to claim 15 in which said grandulate-bed is cylindrical and has a number of equally radially spaced passages and said member of said backwash means is mounted to be turnable around the central axis of said bed.

19. Apparatus for the separation of suspended solids from a fluid under pressure, according to claim 18, in which: said passages are sector-shaped; and the surface of said inlet opening of said member corresponds with the sector-shaped entrance openings of said passages.

20. Apparatus for the separation of suspended solids from a fluid under pressure, according to claim 18 in which said central axis of said granulate-bed is positioned vertically and fluid flows through said bed vertically.

21. Apparatus for the separation of suspended solids from a fluid under pressure, according to claim 18 in which said central axis of said granulate-bed is positioned horizontally and fluid flows through said bed horizontally.

22. Apparatus for the separation of suspended solids from a fluid under pressure, according to claim 12 wherein said backwash means causes the velocity of the fluid flow through the passages to be higher during the backwash procedure than during the filter procedure.

23. Apparatus for separation of suspended solids from a fluid under pressure, according to claim 22, in which the velocity of the fluid during the backwash procedure is at least 1.5 times the velocity of the fluid flow during the filter procedure.

24. Apparatus for the separation of suspended solids from a fluid under pressure, according to claim 12 further comprising means for causing the backwash fluid to flow in pulses through the passage being washed.

25. Apparatus for the separation of suspended solids from a fluid under pressure, according to claim 24, in which during the backwash procedure every passage can be washed with a number of pulses of wash fluid.

26. Apparatus for the separation of suspended solids from a fluid under pressure, according to claim 12 in which said granulate bed has rectangular passages which are situated next to each other and, said member of said backwash means is stepwise movable along said passages.

27. Apparatus for the separation of suspended solids from a fluid under pressure, according to claim 26 wherein means are provided for causing the specific backwash time per rectangular passage to be equal.

28. Apparatus for the separation of suspended solids from a fluid under pressure, according to claim 12 in which: said granulate filterbed is divided into said passage by means of separation walls disposed in said filterbed; and said pressure source means includes at least one mechanical spring supported on at least one of said separation walls.

29. Apparatus for the separation of suspended solids from a fluid under pressure, according to claim 28 in which: said separation walls extend over the full height of said granulate filterbed; a layer of an easy flowing coarse granular medium covers the downstream surface of said bed; and said pressure source means provides said compression force to said filterbed via said layer of a coarse granular medium whereby said, separation walls can penetrate said layer of a coarse granular medium upon further compression of the granulate filterbed.

30. Apparatus for the separation of suspended solids from a fluid under pressure according to claim 1 wherein said filterbed is disposed so that the direction of fluid flow through said filterbed is vertical, and upward during said filtering process.

31. Apparatus for the separation of suspended particles from a fluid under pressure according to claim 1 wherein said filterbed is disposed so that the direction of fluid flow through said filterbed is horizontal.

32. Apparatus for the separation of suspended solids from a fluid under pressure comprising: a housing having a fluid inlet and a fluid outlet; a filterbed, composed of a matrix of a bonded granular medium, said filter bed being disposed in said housing between said inlet and said outlet so that during the filtration process the fluid can flow in one direction through said filter bed and collected suspended solids can be removed from said filterbed during a back-wash operation with a flow of filtered fluid in the reversed direction through the bed; means for dividing said filterbed into at least two passages which are in line with the direction of the fluid flow and separated from each other, and through which the fluid to be filtered continuously flows during the filtering process; and backwash means for sequentially subjecting said passages to a backwash procedure by causing filtered fluid to flow in the opposite flow direction through the passage being washed while the remainder of said passages are simultaneously functioning as filters.

33. Apparatus for the separation of suspended solids from a fluid under pressure, according to claim 32 in which a nonswelling granular filter-medium is used.

34. Apparatus for the separation of suspended solids from a fluid under pressure, according to claim 32 in which the granular filter-medium includes at least two grainsizes.

35. Apparatus for the separation of suspended solids from a fluid under pressure, according to claim 34, in which the different sizes of the filter bed are equally divided.

* * * * *